INVENTOR.
*E. W. RUDY*
BY
*Robert C Smith*
ATTORNEY

United States Patent Office 3,506,953
Patented Apr. 14, 1970

3,506,953
LIGHTWEIGHT RECEIVING SYSTEM FOR SONAR
Erland W. Rudy, Granada Hills, Calif., assignor to The Bendix Corporation, a corporation of Delaware
Filed Sept. 6, 1966, Ser. No. 577,227
Int. Cl. G01s 3/00, 9/68
U.S. Cl. 340—3                                                9 Claims

ABSTRACT OF THE DISCLOSURE

A lightweight sonar system designed for use with an underwater transducer having a limited number of transmitting and receiving elements, each with a moderately wide beam characteristic. The elements are connected in pairs to provide bearing deviation indicator (BDI) information which is processed in a plurality of separate receivers, one for each desired sector of the output cathode ray tube. A ring counter is used to provide scanning of the receiver outputs in the desired sequence and said outputs are connected to control a single beam sweeping 360° of the cathode ray tube face.

---

This invention relates to sonar systems and more particularly to a system for operation with an unusually lightweight transducer such as those for airborne use.

A typical shipboard sonar system utilizes a comparatively large and heavy transducer, usually having a large number of individual transducing elements connected into elongated subassemblies or "staves," said staves being connected together circumferentially such that a large number of sharp beams are produced over 360° around the axis of the transducer. Echo signals received from a particular direction will cause particular staves or groups of staves to produce electrical signals proportional to the magnitude of the received signal. Thus the bearing of the reflecting object is indicated within acceptable accuracy by the particular staves or groups of staves which respond to the reflected signal since their physical relationship to the vessel is known. The range of the reflecting object is determined by comparing the elapsed time between the transmitted pulse and the received pulse. Conventionally, a rotating switch, synchronized with the beam driver on a cathode ray tube, operates to switch the outputs from the several staves or groups of staves into a wide band receiver which, in turn, provides an amplified coordinated input signal to the cathode ray tube. So long as the transducer used in capable of generating a large number of relatively sharp beams with corresponding reception characteristics, this system works quite satisfactorily.

In airborne systems, the transducer used must necessarily be much smaller and inherently has fewer staves with substantially wider beam characteristics. This presents a problem in getting sufficiently accurate bearing information, especially when the smaller transducer is used in combination with the above described arrangement for synchronizing the signals from the staves with the beam driver of the cathode ray tube. The smaller transducer inherently means lower amplitude signals, and the necessarily wide band receiver severely limits the signal to noise ratio available and, hence, the sensitivity of the system.

Because of the relatively slow speed of sound propagation in water, the typical desirable radar PPI readout scheme involving a single beam sweeping 360° is impractical for sonar; hence, the preferred system uses bearing deviation indicator (BDI) information. This scheme involves transmitting a pair of beams or lobes a few degrees apart and covering a limited sector and comparing the transducer responses from said beams which are differently affected by a change in bearing of a distant source point. Switching means may then be provided to sequentially observe this information as it appears on a cathode ray tube. In a currently used system, each BDI display covers a 45° sector, and four sectors are continually illuminated by four separate electron guns in the cathode ray tube to provide a continuous and simultaneous display of echo information received over a 180° field of view. In such an arrangement, means must be provided to give the operator assurance as to which 180° sector he is observing. This system, while very effective, requires a substantial amount of operator skill and requires an expensive four-gun cathode ray tube which is also heavy, bulky and subject to relative drift of the beams. It is an object of the present invention, therefore, to provide a receiver for a sonar system suitable for use with a lightweight transducer having a very high standard of performance including a 360° display.

It is another object of the present invention to provide a sonar system in which the switching arrangement for coordinating the cathode ray tube display with the transducer input information provides for a greatly improved signal-to-noise ratio and in which the signal-to-noise ratio is essentially unaffected by the scanning rate.

It is another object of the present invention to provide a sonar system in which a plurality of bearing deviation indicators are sequentially connected such that a 360° display may be traced on a cathode ray tube having a single gun, thus making the system easier for the operator to read and interpret.

It is another object of the present invention to provide a sonar system meeting the above objectives in which size and weight are substantially reduced through a substantial reduction in the number of large and heavy components required and a simplification and reduction in size of some of the components previously used.

It is a further object of the present invention to provide a lightweight sonar system having a high level of performance in which reliability in substantially better than for systems currently in use through the elimination of a number of components known to have limited reliability.

It is a still further object of the present invention to provide a lightweight sonar system in which there is a substantial reduction in electrical power requirements.

Other objects and advantages will become apparent from consideration of the following specification taken in conjunction with the accompanying drawings in which.

Figure 1:
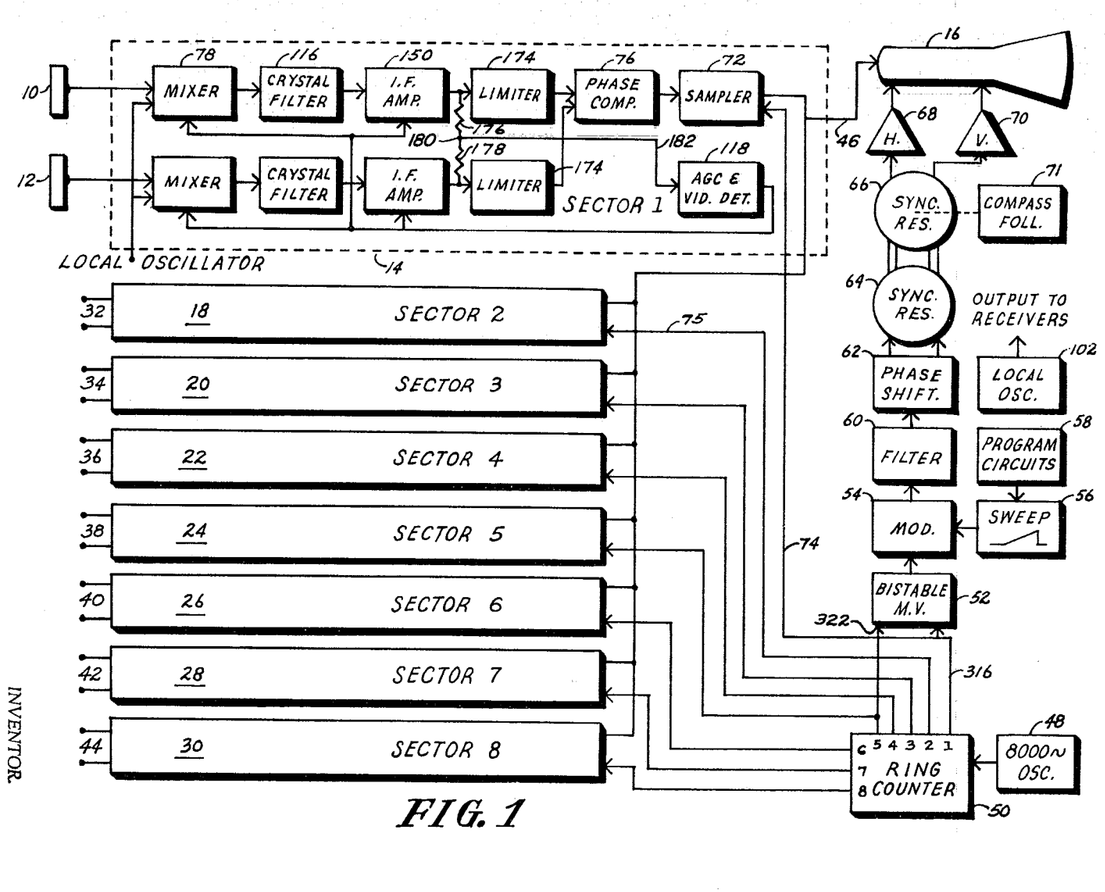
FIGURE 1 is a block diagram of a receiver for a sonar system incorporating the features of my invention.

Referring now to FIGURE 1, members 10 and 12 represent adjacent staves of a transducer having a generally cylindrical configuration. These could also be groups of staves connected together to act as discrete separate staves. Signals received at these staves are supplied as inputs to an amplifier section 14, designated sector 1, which controls the display over 45° of the face of a cathode ray tube 16. Seven identical amplifier sections 18, 20, 22, 24, 26, 28 and 30 provide inputs covering different 45° sectors of the face of the cathode ray tube such that the display covers the entire 360° of the face. Inputs from staves identical to staves 10 and 12 appear as inputs on pairs of wires 32, 34, 36, 38, 40, 42 and 44 connect to each of the amplifiers controlling sectors 2 through 8, respectively. It will be observed that the outputs of all of the amplifiers 18 through 30 are connected to a common lead 46 at the input to the cathode ray tube.

With the above described arrangement it will be understood that the amplifier outputs are all available continuously, and some means must be made available for sampling the amplifier outputs so that the sector signals appear on the cathode ray tube in the proper sequence. This is accomplished in the present system by means of an 8000-cycle master or clock oscillator 48 which provides pulses or triggers at the 8000-cycle rate to an eight-count ring counter 50. Other scanning rates could be used, depending on requirements. The ring counter has output terminals for each of its eight pulses, and these outputs are connected to the amplifier sectors 1 through 8, respectively. Pulses 1 and 5 are also connected to a bistable multivibrator 52 in such manner as to cause the bistable multivibrator to produce a single square wave cycle for each eight pulses of the master oscillator. Therefore the bistable multivibrator 52 has a square wave output of 1000 cycles per second which is supplied to a modulator 54. Also connected to the modulator 54 is the output of a sweep circuit 56 which generates a linear ramp voltage whose amplitude is proportional to the range signal. The input to the sweep circuit is supplied from the program circuits 58 which coordinate the beginning of the ramp voltage with the transmission of a pulse. The pulse transmitting means form no part of this invention and have not been shown. In this manner the amplitude of the sweep voltage is directly related to the time of the transmitted pulse. The output of the modulator 54 is a square wave alternating voltage having an amplitude proportional to the range as established by the sweep voltage. This output is supplied to a filter circuit 60 whose function is to convert the square wave to a sine wave of identical frequency and phase-locked to the output of the master oscillator 48. The signal supplied from filter 60 is split into two outputs in the phase shifter 62, one of which is in phase with the output of the filter 60 and one of which is shifted 90°, and these two outputs are connected to the first of two synchro resolvers. The function of the first said resolver 64 is to provide means for inserting a correction for magnetic variation, and this is accomplished through manual rotation of the input shaft. The output of the first synchro resolver 64 is connected to the second resolver 66 and consists of two A.C. signals phase-related in the same manner as in the output of the phase shifter but different from the output of the phase shifter by the amount of the manual correction inserted. The second of the two synchro resolvers 66 also has an output consisting of two A.C. signals of 1000 c.p.s. which are 90° apart in phase relationship and which are phase-locked to the 8000-cycle oscillator 48, except as phase shifted by the mechanical inputs to the resolver shafts. One of the 1000-cycle output signals from resolver 66 is then supplied through a horizontal amplifier 68 to the horizontal deflecting plates of the cathode ray tube 16, and the other output signal is supplied through a vertical amplifier 70 to the vertical deflecting plates of the cathode ray tube. Given a constant output of modulator 54, the above described arrangement would provide a sweep pattern tracing a circle on the cathode ray tube 16. The increasing voltage from sweep circuit 56 causes this pattern to trace a spiral covering the face of the tube. Since the initiation of the sweep voltage is coordinated with the transmitted pulse, the range of a reflecting object will be radiated by a bright spot having a particular distance from the center of cathode ray tube 16. Because the transducer is normally carried at the end of a flexible cable at a substantial distance under water, some means is required for informing the system of its physical orientation. The transducer therefore includes a compass (not shown) which provides an output to a servo system or compass follower 71 which mechanically rotates the shaft of the second synchro resolver 66, thereby providing a correction to the system to compensate for any physical orientation of the transducer. Thus the system will always indicate directions accurately on the cathode ray tube irrespective of variations in the transducer orientation.

The ring counter 50 scans the output of each receiver sequentially in such manner that the individual sampler circuits in the separate sector amplifiers are turned on sequentially, thereby providing bearing information in a proper position in each sector of the cathode ray tube coordinated with the range information from the sweep circuit 56. It will be observed that count 1 from the ring counter is supplied to sampler 72 over a wire 74. Count 2 is supplied to amplifier 18 over a wire 75, etc. Each count consists of a square wave of a desired voltage level which initiates a ramp voltage in a particular sampler circuit and terminates the ramp at the end of the count. The sweep for sector 1 lasts 125 microseconds, at which time it is shut off and the sweep begins in the sampler circuit for sector 2 for the next 125-microsecond period. If a return signal is received at the transducers 10 and 12, an output from the phase comparator circuit 76 is supplied to the sampler circuit 72, which output will coincide in value with the generated ramp voltage at some point along the ramp. At the point of coincidence, an output pulse is supplied to the cathode ray tube through wire 46 which will brighten the tube at that instant. Thus the position of the beam, as well as the range information, remains locked to the phase of the ring counter output and is subject only to the corrections for transducer orientation and magnetic variation inserted into resolvers 66 and 64, respectively.

Figure 2:
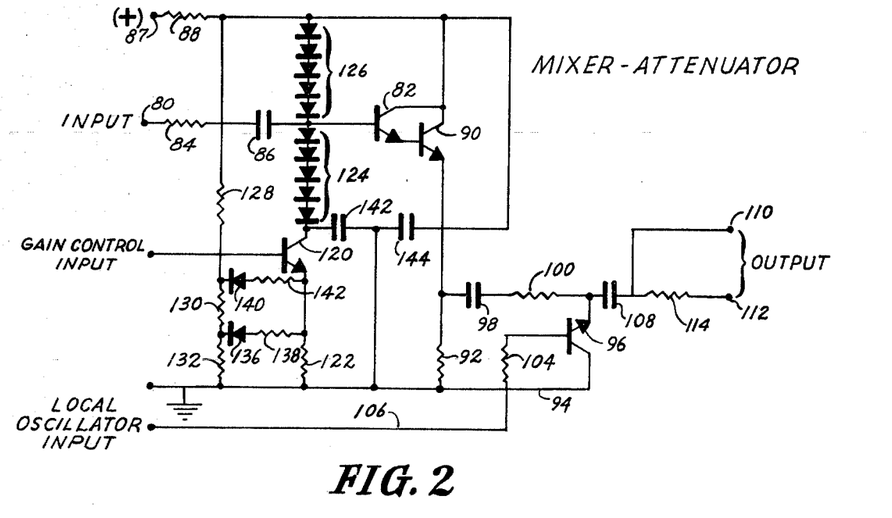
FIGURE 2 is a schematic diagram of the mixer circuit shown in FIGURE 1.

FIGURE 2 is a schematic drawing of one of the mixer circuits 78 shown in the sector 1 amplifier 14. The input from the stave 10, which is actually supplied from beam forming and pre-amplifier circuits connected to the transducer elements, which are well known in the art, appears at an input terminal 80 connected to the base of a transistor 82 through coupling means consisting of a resistor 84 and a capacitor 86. The collector of transistor 82 is connected to a direct current voltage source at terminal 87 through a load resistor 88. Also connected to the terminal 87 is a transistor 90 which is directly coupled to transistor 82 and which is connected to an emitter-follower configuration with its collector connected to the collector of transistor 82 in such manner as to cause the input impedance looking into the circuit to be at a high value. The output of transistor 90 appears across a resistor 92 having one end connected to the ground line 94 and its opposite end coupled to the collector of a mixer transistor 96 through a capacitor 98 and a resistor 100. The input from the local oscillator 102 is supplied to the base of transistor 96 through a resistor 104 by means of a wire 106. The output of mixer transistor 96, which is an alternating current voltage of an intermediate frequency with the input from stave 10 superimposed thereon, is coupled through a capacitor 108 to output terminals 110 and 112, a large value resistor 114 being connected between capacitor 108 and terminal 112. This output is supplied to a crystal filter circuit 116 (see FIGURE 1) whose function is to provide a very closely restricted band width with the filters in each path matched so that any phase shifts will appear equally in each path, since any variation will appear as an error in the bearing information.

Because of the wide variations in the strength of the input signals supplied to terminal 80, it is necessary to include attenuation means to avoid overdriving the transistors 82 and 90 and the mixing transistor 96, which would cause distortion. An automatic gain control (AGC) circuit is included and appears in block 118 of FIGURE 1. This AGC signal, which is also supplied to the mixer circuit in association with the attenuation means, appears at the base of a transistor 120. This transistor is connected to ground line 94 through a bias resistor 122 and through a first series of diodes 124 to the base circuit of transistor 82 and from thence through a second series of diodes 126 to the direct current voltage terminal 87. With the diodes poled as shown, substantial collector voltage is available for transistor 120. While diode banks 124 and 126 are shown including five diodes, this number is related to the magnitude of the input voltage variations to be expected. The emitter circuit of transistor 120 is connected in a voltage contouring circuit including resistors 128, 130 and 132 connected between positive voltage terminal 87 and ground line 94. A diode 136 and a resistor 138 are connected between the ungrounded ends of resistors 132 and 122, and an additional branch containing a diode 140 and resistor 142 is connected between the high side of resistor 130 and the emitter of transistor 120. Each of the diodes in diode banks 124 and 126 has a significant resistivity, even in the forward direction, for small signals. As the signals increase in voltage a point is reached where the resistivity drops substantially. In the present instance, the peak values of the input signals are such that the combined resistivities of five diodes in each branch are required to avoid causing distortion of the input signal through a substantial reduction in resistivity.

The gain control transistor 120, in addition to providing a means for introducing the AGC signal, acts to control gain by controlling the current flow through diode banks 124 and 126, thereby controlling attenuation of the input signal. This flow is established by the effective resistance in the emitter circuit. With the electron flow in the direction from ground toward the emitter of transistor 120, a given magnitude of AGC voltage would result in current flow through resistor 122 only. Increasing amounts of AGC voltage would cause increasing signal attenuation but at a progressively smaller rate of increase. This characteristic is such that, were resistor 122 alone in the circuit, an attenuation would be reached at which substantial increases in AGC voltage would produce minimal changes in attenuation. In order to keep this characteristic nearly linear, diode 136 and resistor 138 are included such that when the voltage drop across diode 136 reaches a value where response to increase in AGC voltage begins to diminish, current also begins to flow through resistors 132 and 138 in parallel with resistor 122, thereby increasing the rate of attenuation. At a still higher value of AGC voltage, the voltage drop across diode 140 will cause it to begin conducting, thus placing an additional current flow path in parallel with that then existing and causing the attenuation characteristic to again revert to the steeper portion of the curve. In this manner the relationship between AGC voltage and signal attenuation is maintained reasonably close to linear over the entire range of AGC input voltage.

In order to control signal attenuation by the diode banks 124 and 126 as desired, it is necessary to provide means such that the A.C. impedance between the ends of the diode banks and ground be at a minimum. This is provided by means of capacitors 142 and 144 which are connected between diode banks 124 and 126, respectively, and ground line 94.

As previously stated, the output of the mixer circuit 78 is supplied to a crystal filter 116 as shown in FIGURE 1. This filter may be one of many configurations known in the art but must provide a very closely restricted band width because of the need to distinguish among many signals which are closely spaced in the frequency spectrum. This filtered signal is supplied to an intermediate frequency amplifier 150 (FIGURE 3) which also receives as an input the AGC signal from the AGC and video detector 118.

Figure 3:
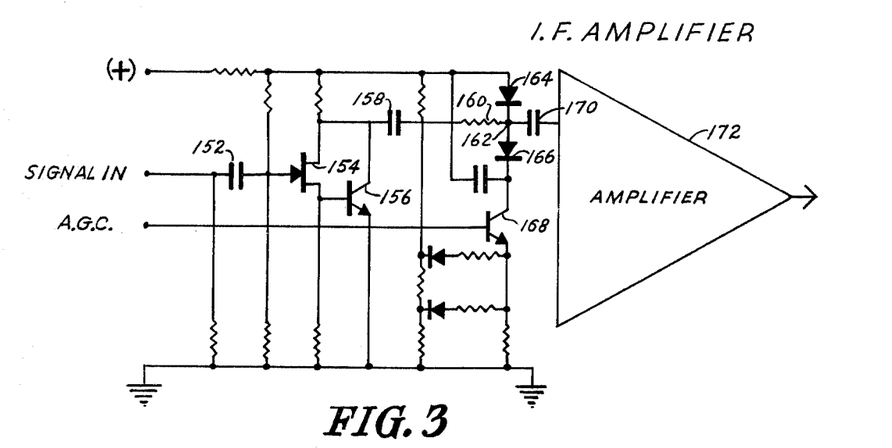
FIGURE 3 is a schematic diagram of the intermediate frequency amplifier of FIGURE 1.

Referring now to FIGURE 3, the input from the crystal filter 116 is connected through a coupling capacitor 152 to the input terminal of a field effect transistor 154 which is, in turn, directly coupled to the base of a transistor 156. These components are connected in a conventional manner, and the purpose of the field effect transistor is to provide an input which has relatively high input impedance and which does not provide any significant capacitive loading on the crystal filter 116. Since the field effect transistor actually has a gain somewhat less than unity, the transistor 156 is cascaded with it to raise the gain of the combined stage to approximately unity. The output of transistor 156 is coupled through a capacitor 158 and a resistor 160 to a junction 162 between two diodes 164 and 166. It will be observed that these diodes are connected in the collector circuit of a transistor 168 which receives on its base the AGC signal from the AGC and video detector 118 (FIGURE 1) and which has connected in its emitter circuit a voltage contouring circuit essentially identical to that connected to transistor 120. Diodes 164 and 166 operate to provide attenuation in a manner essentially identical to that provided by diode blocks 124 and 126. The input signal appearing at terminal 162 is coupled through a capacitor 170 to an amplifier 172 which is a conventional feedback amplifier preferably including an emitter follower in its output to provide the desired low output impedance.

Figure 4:
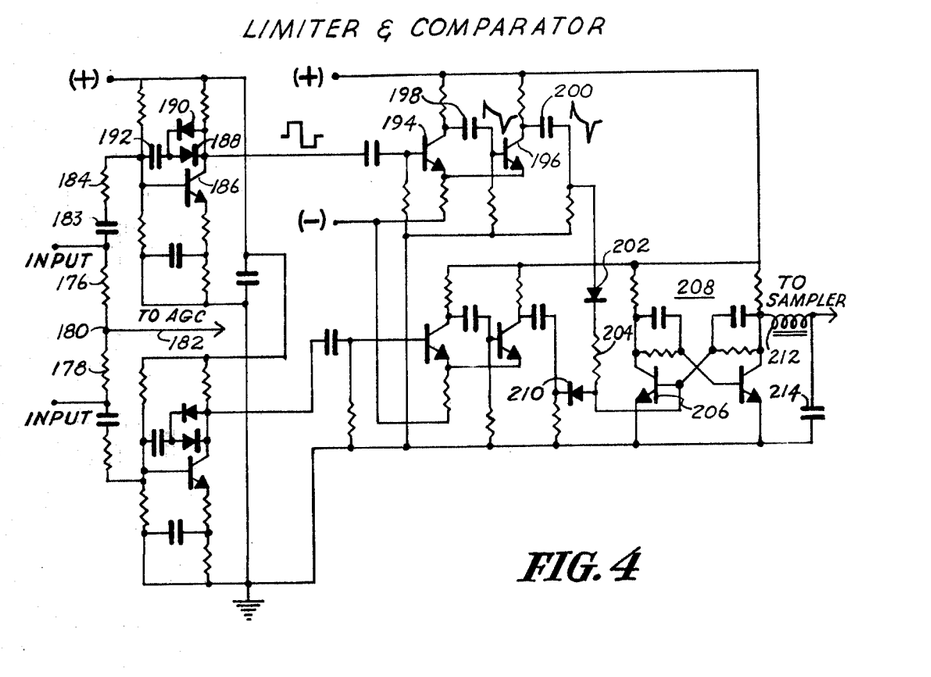
FIGURE 4 is a schematic diagram of the limiter and comparator circuits of FIGURE 1.

As may be seen in FIGURE 1, the output from each of the intermediate frequency amplifiers is connected to a corresponding limiter circuit 174. These outputs are also summed in an adding network consisting of two resistors 176 and 178 connected together at a junction 180. This sum signal is then connected by means of a conductor 182 to the AGC and video detector 118. FIGURE 4 shows both of the limiters 174 in amplifier 14, but only one will be described in detail since they are identical. The input from I.F. amplifier 150 is coupled through a coupling capacitor 183 and a resistor 184 to the base of a transistor 186. Connected in the collector circuit of transistor 186 are oppositely poled diodes 188 and 190 and also a blocking capacitor 192. Diodes 188 and 190 effectively provided the limiting action required since, for a given collector voltage of each polarity, one of these diodes will begin to conduct feedback current to the base of transistor 186, thereby stopping any increase in collector voltage. The output appearing at the collector of transistor 186 is connected to two additional limiter stages which include transistor 194 and 196 and differentiating capacitors 198 and 200 which convert the square wave output of transistor 186 to an output consisting of very sharp spikes of each polarity which are connected through a diode 202 and a resistor 204 to the base of a transistor 206 which operates as one of the active elements in a multivibrator circuit 208. Also connected to the base of transistor 206 is a diode 210 which is poled opposite to diode 202 and which is connected to the differentiating circuit which receives the input from stave 12. Diode 202 passes the positive going pulses from transistor 196 and blocks the negative pulses, while diode 210 passes the negative going pulses and blocks those which are positive. Thus the multivibrator 208 will produce a square wave output which is symmetrical if there is no phase difference between the signals in the two channels. If a phase difference is present, either the positive or the negative voltage swing will be of greater duration than the other, and this difference will apear at the input to the sampler 72. Inductor 212 and capacitor 214 constitute a filter for bypassing the relatively high frequency carrier signal which may appear on the output of the phase comparator.

Figure 5:
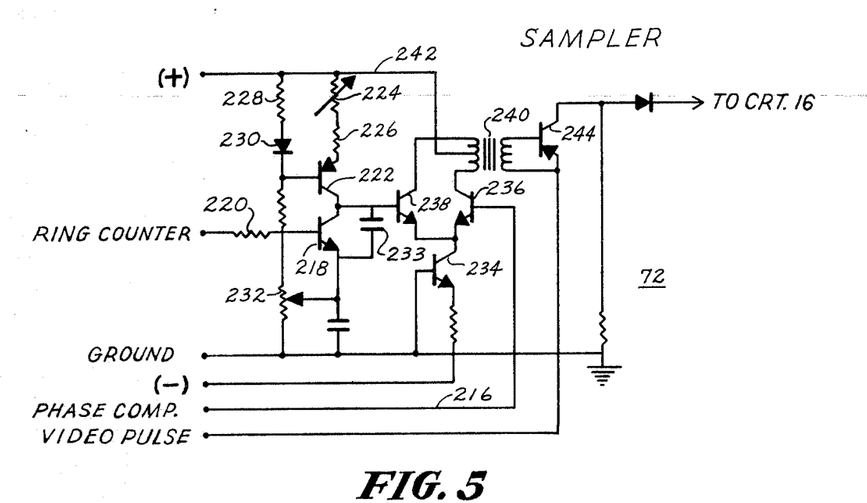
FIGURE 5 is a schematic diagram of the sampler circuit of FIGURE 1.

FIGURE 5 is a schematic drawing of sampler 72 which receives via conductor 216 the output of the phase comparator. It also receives an input from the ring counter 50 which is normally a positive voltage applied to the base of a transistor 218 through a resistor 220. This causes transistor 218 to conduct current. A network consisting of a transistor 222, a variable resistor 224, fixed resistors 226 and 228, and a diode 230 operates as a constant current source which delivers current through transistor 218 and a potentiometer 232 during the time transistor 218 conducts. As previously described, the ring counter 50 will deliver a 125-microsecond negative going pulse to each sampler circuit to correspond with the period of illumination of its particular sector of the cathode ray tube 16, and this pulse appears on the base of transistor 218 which causes this transistor to stop conducting current, whereupon the constant current source begins to charge a capacitor 233 at a steady rate between known positive values such as +4 volts to +8 volts. A transistor 234 which has its emitter connected to a negative voltage supply acts as a constant current source to a pair of transistors 236 and 238 which have their collectors connected to opposite ends of the primary winding of a transformer 240. The center tap of transformer 240 is connected to a positive voltage source by means of a wire 242. When the voltage on capacitor 233, which also appears on the base of transistor 238, increases in value to the point where it equals the voltage from the phase comparator appearing on transistor 236, the current flow switches from the lower half to the upper half of the primary winding of transformer 240, and an output pulse appears at its secondary winding. This output pulse, whose length is determined by the transformer design, acts as a gate to cause a transistor 244 to conduct a brightening pulse to the cathode ray tube 16. As will appear hereafter, the video pulse signal applied to the emitter of transistor 244 from the AGC and video detector is present continuously but is supplied to the cathode ray tube 16 only as it is gated on by the coincidence in value of the phase comparator and sampler ramp generator signals.

Figure 6:
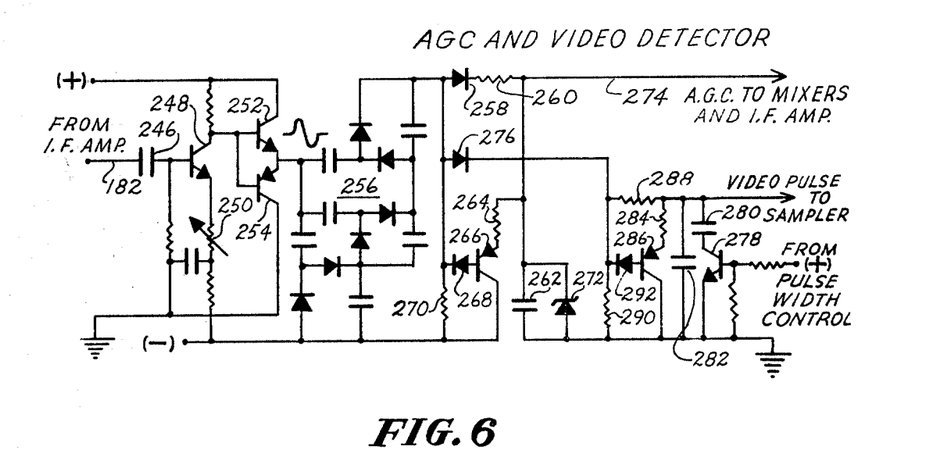
FIGURE 6 is a schematic diagram of the automatic gain control and video detector circuits of FIGURE 1.

The AGC and video detector 118 is shown in detail in FIGURE 6 wherein the summation voltage from the intermediate frequency amplifiers enters on conductor 182. This signal is coupled by means of a capacitor 246 to the base of a transistor 248 which serves as an amplifier and whose gain is variable by means of a potentiometer 250 connected in its emitter circuit. The collector of transistor 248 is connected to a pair of transistor 252 and 254 which are connected as complementary emitter followers to provide a full wave output to a conventional voltage multiplier circuit 256. While this circuit is shown as a sextupler, greater or lesser amounts of multiplication could be used, depending upon requirements. This voltage multiplication is desirable to make available a substantial dynamic range for the automatic gain control. The high voltage output of multiplier 256 is supplied to a diode 258 and a resistor 260 which act in conjunction with a large capacitor 262 to control the time constant of AGC signals in the increasing direction, while a different time constant is provided for voltage swings in the decreasing direction by means of a resistor 264, a transistor 266 and a diode 268 which are connected to a negative voltage source through a large value resistor 270. A Zener diode 272 is provided to protect capacitor 262 against damage from excessive voltage. The AGC voltage thus generated is connected to the mixers 78 and the I.F. amplifiers 150 by means of a wire 274.

The output of multiplier circuit 256, which is the amplified return pulse, is also supplied through a diode 276 to a filter circuit before being delivered as a video pulse to the sampler 72. The transmitted pulse may be comparatively long, such as 35 milliseconds, or comparatively short, such as 3.5 milliseconds, and some sonar systems provide for transmitting either long or short pulses since each has advantages depending upon the conditions encountered. The longer pulse obviously contains more total energy and therefore tends to result in satisfactory returns from targets at a greater range. Shorter pulses are less susceptible to loss of resolution. The present system is designed to receive both types of reflected signals, and the filter system to be described is designed to accommodate either. When the longer pulse is transmitted, a bias voltage is connected to the base of a transistor 278 which causes it to conduct current and effectively grounds one side of a capacitor 280. Received pulses passing diode 276 cause a voltage build-up across capacitor 280, which is of comparatively large value. A second capacitor 282, connected in parallel with capacitor 280, is of smaller value such that its presence has littel effect. When the pulse begins to decay, capacitor 280 discharges rapidly through a resistor 284 and a transistor 286 to ground, thus insuring a relatively sharp cutoff rather than the relatively slow decay which would occur if capacitor 280 were to discharge through the alternate path defined by resistors 288 and 290. A diode 292 is connected in the base circuit of transistor 286 to protect transistor 286 against excessive voltage peaks. When the short pulse is transmitted, the bias supply for transistor 278 is not energized, and capacitor 280 is ineffective. Satisfactory filtering for the 3.5-millisecond pulse is provided by the capacitor 282.

Figure 7:
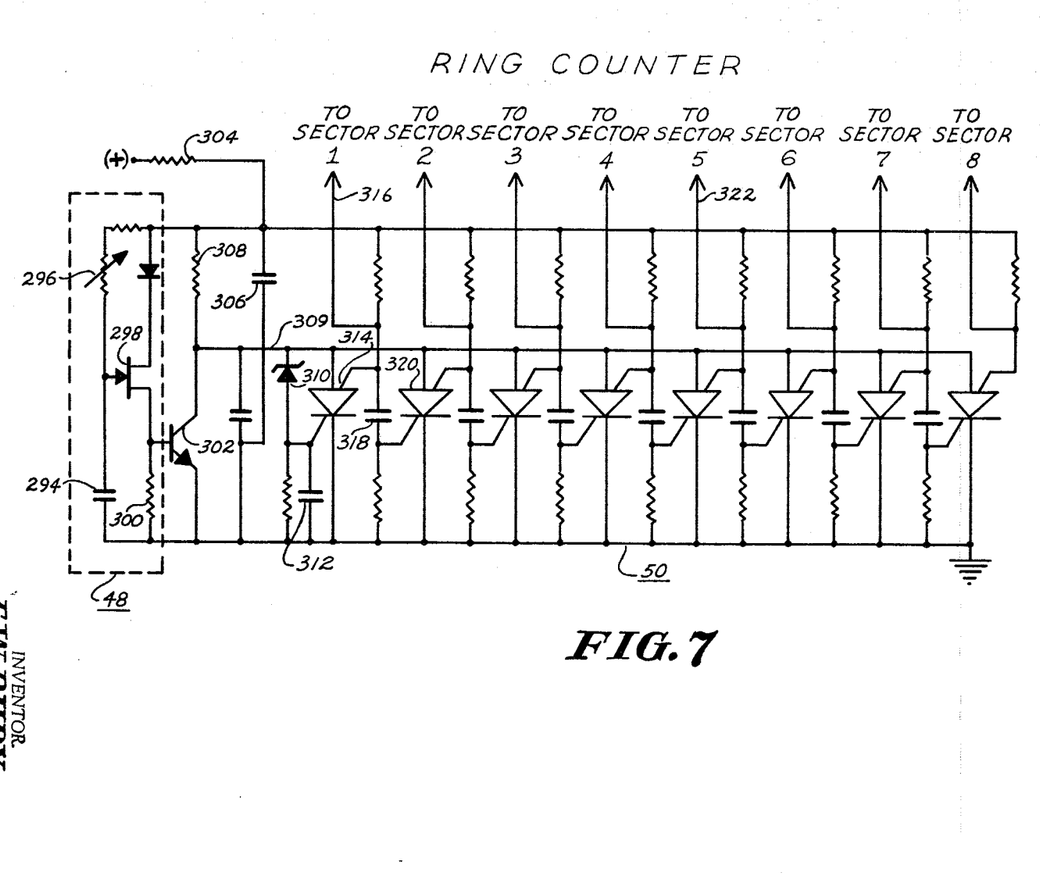
FIGURE 7 is a schematic diagram of the ring counter of FIGURE 1.

The 8000-cycle oscillator 48 and the ring counter 50 provide output signals to coordinate the bearing information with the range information, and these circuits appear in detail in FIGURE 7. Neither the oscillator circuit 48 nor the ring counter 50 is unusual. The oscillator 48 is a conventional unijunction transistor oscillator and includes a capacitor 294 and a variable resis'or 296 which act as frequency controlling elements. The output frequency may be varied by adjustment of resistor 296, and the output which appears at base 2 of the unijunction transistor 298 is developed across a resistor 300 which is also connected into the base circuit of a transistor 302.

The positive power source for the oscillator and the ring counter is connected through a decoupling circuit comprising a resistor 304 and a capacitor 306. Unwanted voltage spikes from the power supply are grounded through capacitor 306 while the D.C. voltage is connected through a resistor 308 to the collector of transistor 302 and through a bus 309 to the anodes of eight silicon controlled switches (SCS), each of which operates to conduct one of every eight pulses from oscillator 48 to the respective sector amplifiers. Any of several ring counter configurations might be chosen to accomplish the desired function. When the ring counter 50 has not been operating and full anode voltage appears on line 309, all the silicon controlled switches are maintained off. This voltage exceeds the breakdown voltage of a Zener diode 310 which causes a voltage build-up across a capacitor 312 which gates on a silicon controlled switch 314, thereby causing a 125-microsecond negative going pulse to appear on lead 316 which is connected to the sampler circuit of sector 1 amplifier 14. During this time the capacitor 318 is discharged, At the time of the next triggering pulse from oscillator 48, line 316 returns to a positive potential which is coupled through capacitor 318 to the ca'hode gate of SCS 320, thus causing conduction of SCS 320, and so on until the entire string of eight SCS's have conducted a negative going 125-microsecond pulse to the corresponding output lead. When the last pulse has been delivered, the voltage on line 309 rises again to full anode voltage, causing a breakdown across Zener diode 310 and again causing charging of capacitor 312, conduction of SCS 314 and beginning again the eight-count cycle.

Figure 8:
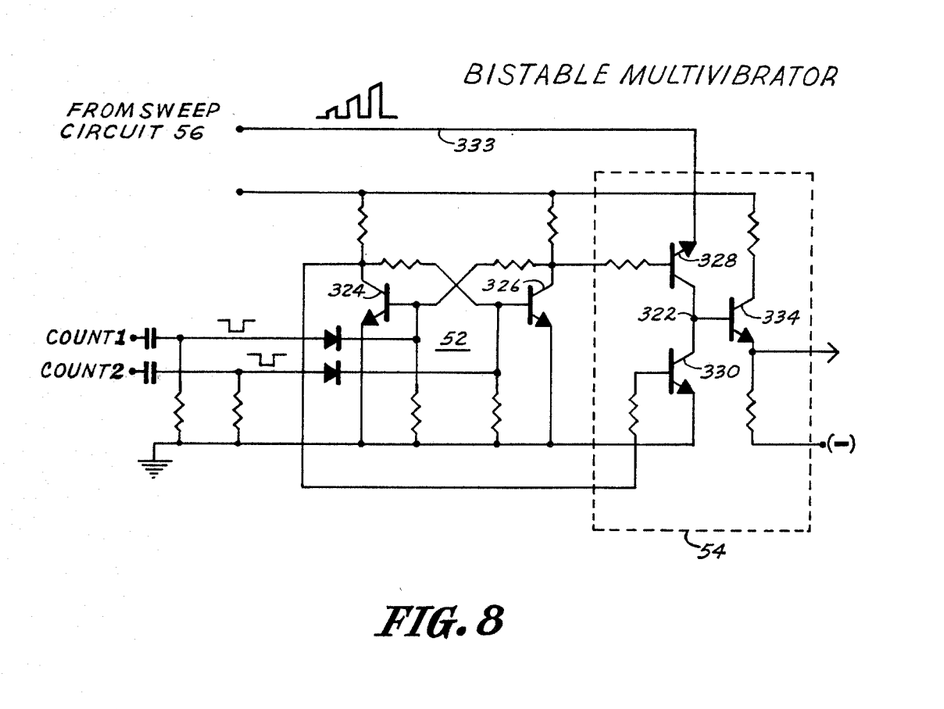
FIGURE 8 is a schematic diagram of the bistable multivibrator and modulator circuits of FIGURE 1.

Referring now to FIGURE 8, the first and fifth counts are connected to the bases of transistors 324 and 326 of a conventional bistable multivibrator 52, causing this multivibrator to produce a 1000-c.p.s. square wave output, alternate half cycles of which are delivered to the bases of a pair of transistors 328 and 330 which constitute part of transistor modulator or chopper 54. These transistors alternately connect a junction point 332 to the sweep voltage coming in on a line 333 from sweep circuit 56 and to ground, thereby chopping the sweep voltage at the rate of 1000 c.p.s. This chopped voltage is connected to the base of a transistor 334 which acts as an emitter follower amplifier and which supplies its output to a filter 60. Since the output of modulator 54 is still basically a square wave and since the synchro resolvers 64 and 66 operate more satisfactorily with a sine wave input, the filter 60, which is essentially a low pass filter, is provided to convert the square wave output of modulator 54 into a form more nearly like a sine wave.

The sine wave output of filter 60 retains a phase relationship based on the phase established by the ring counter 50. The synchro resolvers 64 and 66 have sets of stator windings which are ninety electrical degrees apart, and it is necessary therefore to convert the output of filter 60 to two sine wave signals, one of which is the output signal and one of which is displaced 90 electrical degrees therefrom. This phase shifter is conventional, the only requirements being that the 90° phase relationship must be maintained within very close limits, and the amplitudes of the two signals must be as close to identical as possible since these signals are connected to the vertical and horizontal deflection plates to provide the spiral sweep pattern on the cathode ray tube 16, and any unbalance will distort this sweep pattern and lead to erroneous readings as to range of the received signal. Ordinarily the phase shifter circuit 62 would include gain control adjustments to assure the desired phase and amplitude values.

The synchro resolvers 64 and 66 are standard synchros with 90° windings for receiving the two outputs of the phase shifter. The phase relationship of the two 90° input signals is maintained, but both may be shifted simultaneously through insertion of a mechanical input to either or both of the synchos as set forth above, and the resulting signals, which are corrected in phase for transducer orientation and/or magnetic variation, are then amplified in amplifiers 68 and 70 and applied to the horizontal and vertical deflecting plates of the cathode ray tube 16.

From the foregoing it will be appreciated that the receiving system described makes possible substantially improved performance and greater ease of operation. Through the use of separate amplifiers connected to each stave, narrow band filtering may be used which, as compared with the broad band systems currently in use, greatly improves the signal-to-noise ratio, thus making possible very satisfactory performance despite the need to use a transducer having fewer staves and wider beam characteristics than is used in shipboard sonar. The provision for 360° readout on the cathode ray tube greatly simplifies operation, and those skilled in the art will recognize that the system described has a very limited number of the inherently large and heavy components which so often result in sonar systems of great size and weight.

While only a single embodiment has been described herein, it is recognized that modifications will occur to those skilled in the art, and I do not wish to be limited to the embodiment shown or otherwise than as set forth in the following claims.

I claim:

1. In a receiver for an echo ranging sonar system including
a transducer having a plurality of circumferentially arranged receiving elements connected to produce individual beams in discrete directions with connections to said elements such that pairs of adjacent beams provide bearing information over known sectors, a cathode ray tube for providing a display of the received signals, and scanning means for coordinating the cathode ray tube display with the beam information from said receiving elements;
a master oscillator;
means generating a spiral sweep voltage for said cathode ray tube which is initiated by a transmitted pulse and phase-locked to said master oscillator;
means connecting said spiral sweep voltage to said cathode ray tube;
receivers for each of said sectors, each of which includes a pair of separate narrow band receiving means connected to receive input signals from adjacent elements and a phase comparator producing an output varying in magnitude with the difference in phase between said input signals;
and scanning means connected to said master oscillator for successively connecting the outputs of said receivers to said cathode ray tube such that bearing and range information covering 360° around the transducer is reproduced on the face of the cathode ray tube.

2. A receiver for an echo ranging sonar system as set forth in claim 1 wherein synchro resolver means is connected to receive said spiral sweep voltage, said resolver including means responsive to an external condition for producing a phase shift in said sweep voltage proportional to said condition.

3. A receiver for an echo ranging sonar system as set forth in claim 2 wherein said synchro resolver means includes a first synchro device the rotor of which may be manually rotated to correct for magnetic variation and a second synchro device whose rotor is rotatable in response to changes in response to changes in transducer orientation.

4. A receiver for an echo ranging sonar system as set forth in claim 1 wherein said scanning means includes a sampler circuit connected to each of said phase comparators including means generating a ramp voltage, counter means connected to said master oscillator for starting and stopping said ramp voltage in each sector amplifier in sequence, and means responsive to coincidence in value between said phase comparator output signal and said ramp voltage for supplying a brightening pulse to said cathode ray tube.

5. In a receiver for an echo ranging sonar system including
a transducer having a plurality of circumferentially arranged receiving elements connected to produce individual beams in discrete directions with connections to said elements such that pairs of adjacent beams provide bearing information over known sectors, a cathode ray tube for providing a display of the received signals, and scanning means for coordinating the cathode ray tube display with the beam information from said receiving elements;
signal processing means including said scanning means comprising a narrow band receiver connected to receive an input signal from each of said elements, said receivers being operative in pairs to process input signals representing said adjacent beams,
a phase comparator connected to receive the outputs from each of said pairs of receivers and producing a signal varying in amplitude with the difference in phase between the output signals of said receivers;
a master oscillator;
means for generating an increasing ramp voltage time-related to a transmitted pulse and modulating means phase-locked to said master oscillator for modulating said ramp voltage;
means for connecting said modulated ramp voltage signal to said cathode ray tube to produce a spiral scanning pattern on the face of said tube;
a sampler circuit including a second ramp voltage-generating circuit connected to each of said phase comparator circuits, each of said sampler circuits being connected to said master oscillator such that enabling pulses are supplied by said master oscillator in sequence to initiate and terminate each of said ramps, and means responsive to coincidence in magnitude of the sampler ramp voltage and the phase comparator output voltage for producing an output pulse for brightening a spot on the face of the cathode ray tube.

6. A receiver for an echo ranging sonar system comprising:
- a transducer having a plurality of circumferentially arranged receiving elements to produce individual beams in discrete directions;
- a narrow band receiver connected to receive an input signal from each of said elements;
- a phase comparator connected to receive the outputs from each pair of said receivers and producing a signal varying in amplitude with the difference in phase between said pair of receiver output signals;
- scanning means including a counter for selecting the output signals from said phase comparators in the desired sequence such that each of said signals constitutes a bearing deviation indicator with respect to a pair of said adjacent beams;
- a single lead connected to receive said bearing deviation indicator signals in the desired sequence;
- ramp voltage generating means initiated by a transmitted pulse connected to said counter for generating a voltage increasing in magnitude with time;
- and a cathode ray tube connected to said ramp voltage generating means and to said lead for providing a 360° display of the echo information appearing at said transducer.

7. In a receiver for an echo ranging sonar system including
- a transducer having a plurality of circumferentially arranged receiving elements connected to produce individual beams in discrete directions with connections to said elements such that pairs of adjacent beams provide bearing information over known sectors, a cathode ray tube for providing a display of the received signals, and scanning means for coordinating the cathode ray tube display with the beam information from said receiving elements;
- a master oscillator;
- means for generating a ramp voltage in response to a transmitted pulse and means phase-locked with said master oscillator for modulating said ramp voltage;
- a resolver connected to receive said modulated ramp voltage having an additional input responsive to an external condition for causing a phase shift in said ramp voltage variable with said external condition;
- means connecting said ramp voltage to said cathode ray tube;
- receivers for each of said sectors each of which includes a pair of separate narrow band receiving means connected to receive input signals from adjacent elements, a phase comparator producing an output varying in magnitude with the difference in phase between said input signals, and a sampler circuit including means for generating a second ramp voltage and means responsive to coincidence in value between said second ramp voltage and said comparator output signal for supplying a brightening pulse to said cathode ray tube; and
- a counter connected to said master oscillator for sequentially supplying pulses to each of said receivers for initiating and terminating said second ramp voltage.

8. A receiver for an echo ranging sonar system including a transducer having a plurality of circumferentially arranged receiving elements connected to produce individual beams in discrete directions with connections to said elements such that pairs of adjacent beams provide bearing information over known sectors, said receiver including a master oscillator;
- means initiated by a transmitted pulse and phase-locked to said oscillator for generating an alternating voltage variable with time from said transmitted pulse;
- receivers for each of said sectors, each of which includes a pair of separate narrow band receiving means connected to receive input signals from adjacent elements and a phase comparator producing an output varying in magnitude with the difference in phase between said input signals;
- an output device connected to said variable alternating voltage;
- and scanning means connected to said master oscillator for successively connecting the outputs of said receivers to said output device.

9. In a receiver for an echo ranging sonar system including
- a transducer having a plurality of circumferentially arranged receiving elements connected to produce individual beams in discrete directions with connections to said elements such that pairs of adjacent beams provide bearing information over known sectors, read-out means for providing a visual display of the received signals, and means for providing coordination of the read-out means with the beam information from said receiving elements;
- a master oscillator;
- means initiated by a transmitted pulse and phase locked to said oscillator for producing a predetermined pattern on said read-out device which varies with the time from the start of said transmitted pulse;
- receivers for each of said sectors, each of which includes a pair of separate narrow band receiving means connected to receive input signals from adjacent elements and a phase comparator producing an output varying in magnitude with the difference in phase between said input signals;
- and scanning means connected to said master oscillator for successively connecting the outputs of said receivers to said read-out device such that bearing and range information covering 360° around said transducer are simultaneously reproduced on said read-out device.

References Cited
UNITED STATES PATENTS 2,946,980  7/1960  Bridges et al. _________ 340—6

RICHARD A. FARLEY, Primary Examiner

U.S. Cl. X.R.

340—6